(No Model.) 2 Sheets—Sheet 1.

E. D. PATTERSON & J. T. WEBSTER.
COTTON CHOPPER.

No. 356,424. Patented Jan. 18, 1887.

Witnesses
M. E. Fowler
J. W. Garner

Inventors
E. D. Patterson
J. T. Webster
By their Attorneys (No Model.) 2 Sheets—Sheet 2.
E. D. PATTERSON & J. T. WEBSTER.
COTTON CHOPPER.
No. 356,424. Patented Jan. 18, 1887.
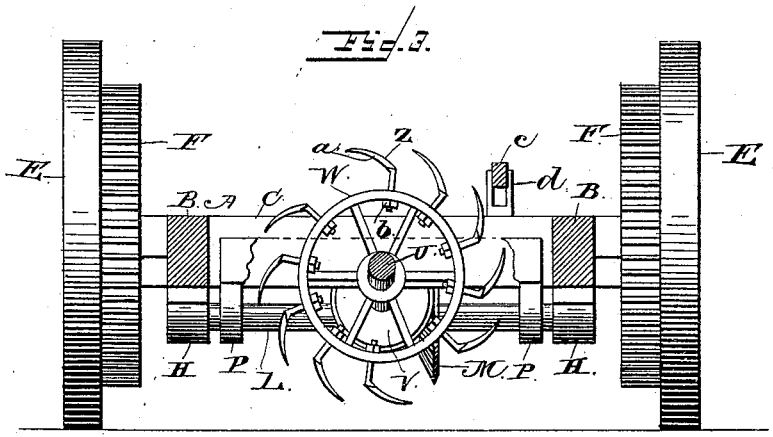
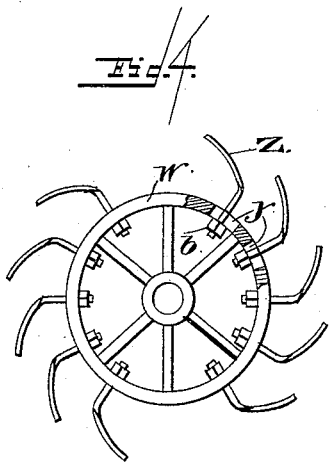

UNITED STATES PATENT OFFICE.

EDWIN DOWD PATTERSON AND JAMES THOMAS WEBSTER, OF HAYWOOD, NORTH CAROLINA.

COTTON-CHOPPER.

SPECIFICATION forming part of Letters Patent No. 356,424, dated January 18, 1887.

Application filed August 30, 1886. Serial No. 212,230. (No model.)

*To all whom it may concern:*

Be it known that we, EDWIN DOWD PATTERSON and JAMES THOMAS WEBSTER, citizens of the United States, residing at Haywood, in the county of Chatham and State of North Carolina, have invented a new and useful Improvement in Cotton-Choppers, of which the following is a specification.

Our invention relates to an improvement in cotton-choppers; and it consists in the peculiar construction and combination of devices, that will be more fully set forth hereinafter, and particularly pointed out in the claims.

Figure 1:
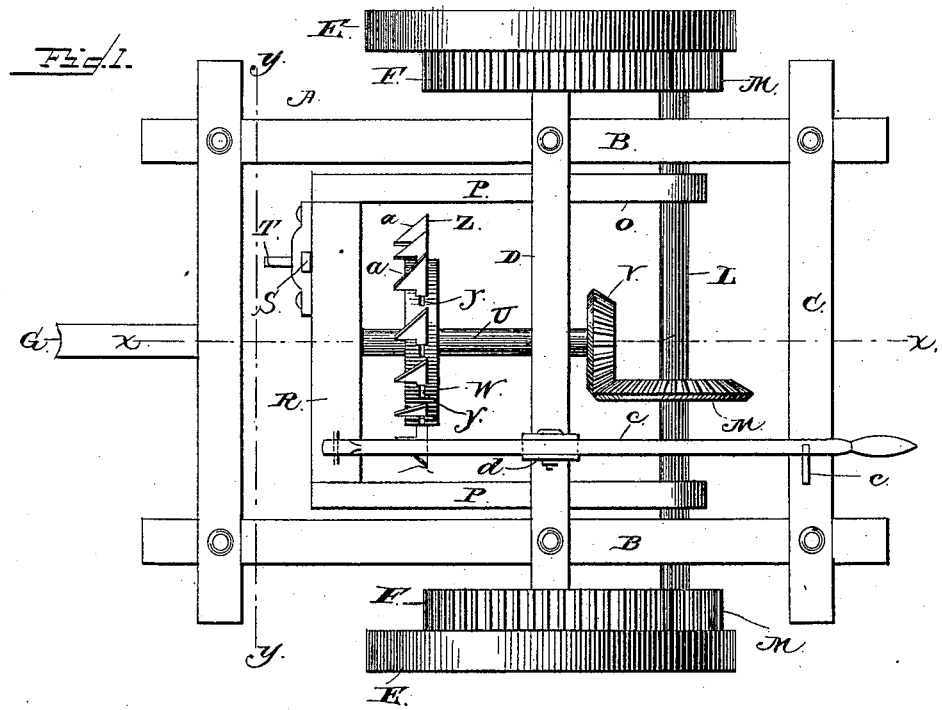
Figure 2:
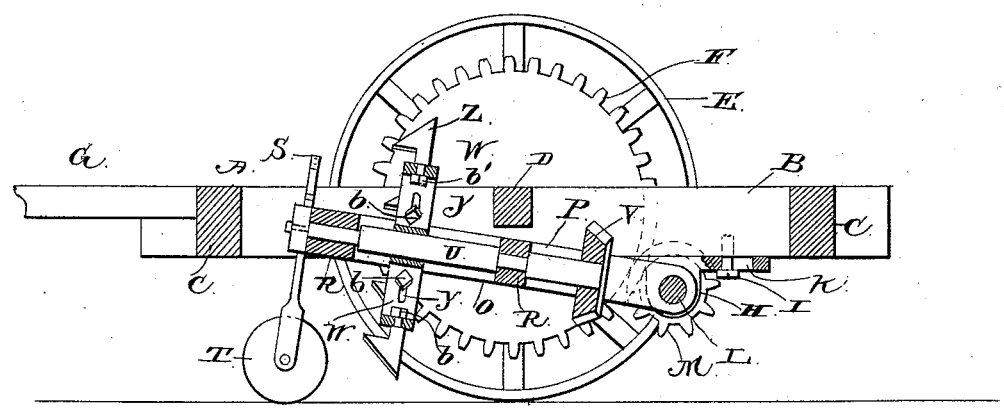

In the drawings, Figure 1 is a top plan view of a cotton-chopper embodying our improvements. Fig. 2 is a vertical longitudinal sectional view taken on the line $x\ x$ of Fig. 1.

A represents a rectangular frame, comprising the side beams, B, and the end beams, C.

D represents the axle, which extends transversely across the same, near the center thereof, and on the spindles of the axle are mounted driving-wheels E. Attached to the inner side of each wheel E or formed integrally therewith is a gear-wheel, F.

G represents a tongue or draft-pole, which is attached to the front end of the frame. On the under side of the frame, near the rear end thereof, are secured bearing-boxes H by means of bolts I, which extend through longitudinal slots K, with which the arms of the bearing-boxes are provided. The bolts I enter the beams B, and it will be readily understood that, by reason of the slots K, the bearing-boxes may be adjusted longitudinally on the frame.

L represents a shaft, which is journaled in the boxes H. On the outwardly-projecting ends of the shaft, beyond the sides of the frame, are secured pinions M, which mesh with the gear-wheels F, and near the center of the shaft L is secured a mitered gear-wheel, N.

O represents the chopper-frame, comprising the side bars, P, and the connecting-bars R. The rear ends of the side bars project rearwardly beyond the connecting-bars, and are hinged or pivoted upon the shaft L. By this construction the front end of the chopper-frame is free to be raised or lowered.

S represents a vertical standard, which is secured to the front end of the chopper-frame, and is vertically adjustable thereon. In the lower bifurcated end of this standard is journaled a supporting-wheel, T, the function of which is to support the front end of the chopper-frame at the desired distance from the ground.

Journaled longitudinally in bearing-boxes, which are attached to the centers of the cross-bars P of the chopper-frame, is a shaft, U. To the rear end of this shaft is fixed a mitered pinion, V, which meshes with the wheel N.

W represents a chopping-wheel, which is fixed to the shaft U, near the front end thereof. In the rim of the wheel W are made longitudinal slots Y, in which we secure the threaded spindles of removable chopping-blades Z. The said chopping-blades have the front beveled cutting-edges, $a$, arranged at an angle of about forty-five degrees, and are removable from the chopping-wheel, being secured thereto by passing their shanks through the slots in the chopping-wheel and placing clamping-nuts $b$ on the threaded ends of the shanks.

It will be observed by reference to Fig. 3 that the chopping-blades do not extend entirely around the rim of the wheel, but that some of them, at suitable regular distances, are omitted, thus causing as many "stands" of cotton to be left in the row at each rotation of the chopping-wheel as there are spaces left among the chopping-knives thereof. The slots X permit the knives to be adjusted on the chopping-wheel to any desired distance apart.

The operation of our invention will be very readily understood. The wheel P supports the front end of the chopping-frame, and the rotation of the wheels E as the machine is drawn forward is imparted to the chopping-wheel by the gearing hereinbefore described, thereby causing the chopping-wheel to rotate transversely on the row of plants, so as to chop out the same, leaving stands at suitable regular intervals. In order to increase the rapidity of the rotation of the chopping-wheel, we remove the pinions M from the shaft L and substitute pinions of less diameter for them, and then adjust the bearing-boxes H forwardly on the frame A, so as to cause the smaller pinion to engage the gear-wheels F. If it be desired to decrease the speed of the chopping-wheel, the pinions on the shaft L are removed, the boxes H are adjusted rearwardly on the frame A, and larger pinions are placed on the shaft and caused to gear with the wheels F.

The front end of the chopper-frame may be raised from the ground by means of a lever, c, which is attached to the said frame, and is fulcrumed in the standard d on the axle. The rear end of the lever is engaged by a stop, e, on the rear end of the frame a, when the front end of the chopper-frame is elevated, thus supporting the chopper-frame in a raised position.

Having thus described our invention, we claim—

1. The combination, in a cotton-chopper, of the frame A, having the axle, the driving-wheels mounted on the axle and having the gear-wheels F, the shaft L, journaled transversely in the frame and having the pinions M, engaging the wheels F, and the miter gear-wheel N, the frame O, hinged to the shaft L, the longitudinal shaft U, journaled in the frame O and having the chopping-wheel, and the miter-wheel V, meshing with wheel N, the vertically-adjustable supporting-wheel T at the front end of frame O, and the lever to raise and lower frame O, substantially as described.

2. The combination of the frame A, having the gear-wheels F, the boxes H, longitudinally adjustable on the frame A, the shaft L, journaled in the said boxes and having the pinions adapted to engage the wheels F, the chopper-frame hinged or pivoted to the shaft L, and the chopping-wheel having its shaft journaled to the chopper-frame and geared to the shaft L, substantially as described.

In testimony that we claim the foregoing as our own we have hereto affixed our signatures in presence of two witnesses.

EDWIN DOWD PATTERSON.
   JAMES THOMAS WEBSTER.

Witnesses:
 L. R. EXLINE,
 S. W. BREWER.